United States Patent
Haus et al.

(10) Patent No.: US 7,260,291 B2
(45) Date of Patent: Aug. 21, 2007

(54) COUPLED MODE ARRAYED WAVEGUIDE GRATING

(75) Inventors: Hermann A. Haus, deceased, late of Lexington, MA (US); by Eleanor L. Haus, legal representative, Lexington, MA (US); Ryan N. Lang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 77 days.

(21) Appl. No.: 11/095,679

(22) Filed: Mar. 31, 2005

(65) Prior Publication Data
US 2006/0222294 A1    Oct. 5, 2006

(51) Int. Cl.
  *G02B 6/34*    (2006.01)
  *G02B 6/26*    (2006.01)
  *G02B 6/42*    (2006.01)
(52) U.S. Cl. .......................... 385/37; 385/28; 385/39; 385/48
(58) Field of Classification Search ............ 385/14–15, 385/27–28, 30–31, 37, 39, 48, 50, 129–132
See application file for complete search history.

(56) References Cited

U.S. PATENT DOCUMENTS

2004/0258348 A1*  12/2004  Deliwala ............... 385/14

OTHER PUBLICATIONS

Eisenberg et al., "Dittraction management" Physical Review Letters APS, USA, vol. 85 No. 9, Aug. 28, 2000, pp. 1863-1866.*
Chiang, "Coupled-zigzag-wave theory for guided waves in slab waveguide arrays" Journal of Lightwave Technology, USA vol. 10, No. 10 Oct. 1992, pp. 1380-1387.*
Eisenberg et al., "Diffraction management" Physical Review Letters APS, USA, vol. 85 No. 9, Aug. 28, 2000, pp. 1863-1866.

* cited by examiner

*Primary Examiner*—Frank G. Font
*Assistant Examiner*—Michael P. Mooney
(74) *Attorney, Agent, or Firm*—Gauthier & Connors LLP

(57) ABSTRACT

An AWG device includes a plurality of arrayed waveguides positioned close to each other. An input signal excites one of these coupled waveguides and the power is then transferred to all of the arrayed waveguides so there are enough degrees of freedom in the device to achieve any desired distribution.

10 Claims, 18 Drawing Sheets

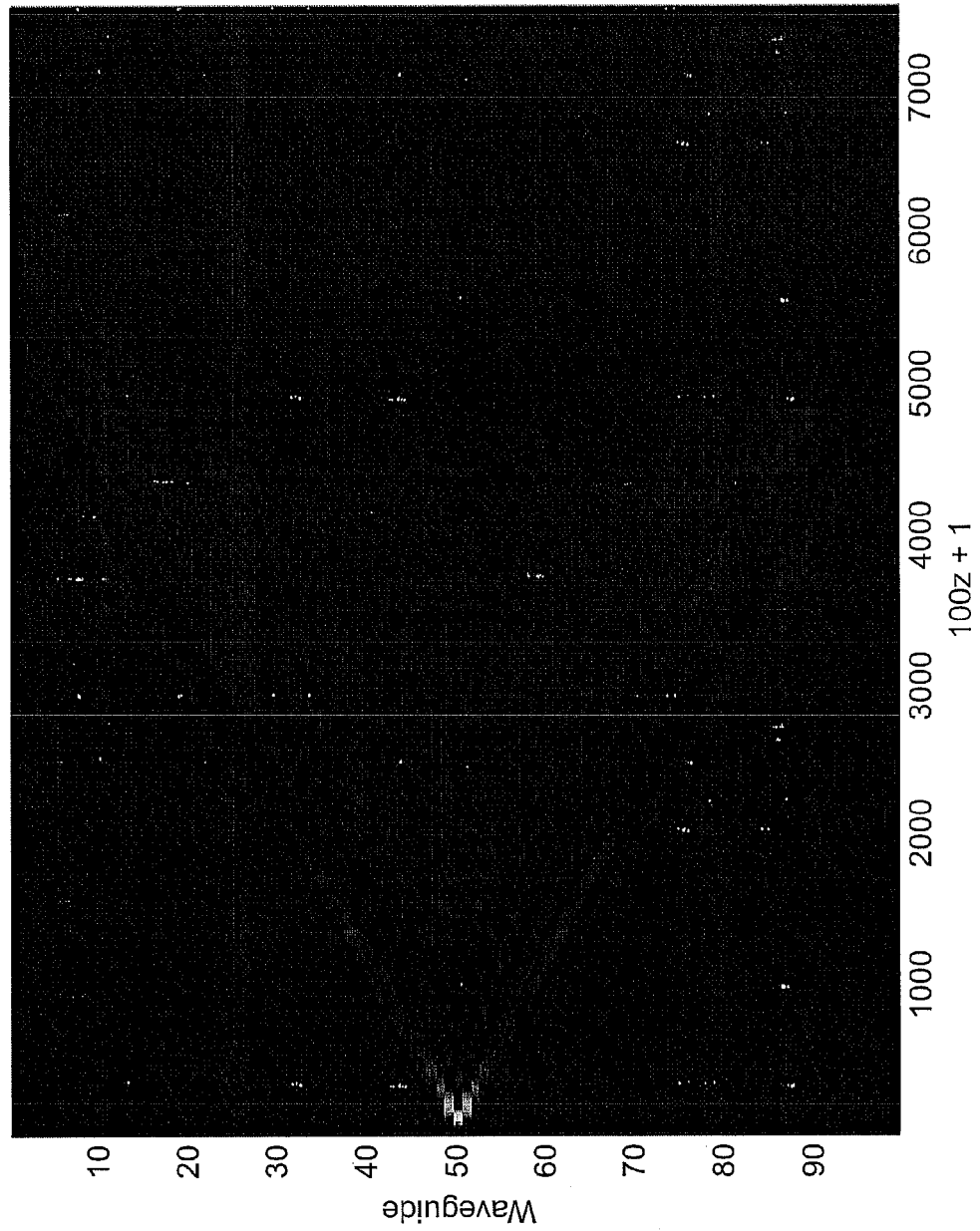

COUPLED MODE ARRAYED WAVEGUIDE GRATING

BACKGROUND OF THE INVENTION

The invention relates to the field of arrayed waveguide grating (AWG), and in particular to an AWG device using an input structure comprising of an array of coupled waveguides.

AWGs can be useful in many optical communication applications where wavelength-specific filtering and processing are required. Unlike the legacy TDM systems, AWGs function purely in the optical domain when filtering the independent wavelength bands and thus do not require expensive, electrical up/down conversion. As all-optical wavelength filtering components, AWGs have become attractive for optical communication systems. However, as with any component, many technical and economic factors impact the viability of AWGs in the market.

AWGs are thin, fragile chips with narrow waveguides produced using planar lightwave circuit (PLC) processing techniques. The waveguides can be fabricated by forming (e.g., etching) waveguide core patterns over a substrate and undercladding. A doped glass overcladding (e.g., borophosphate silicate glass or BPSG) is then formed over the cores, to complete the waveguide formation. As an "integrated" PLC component in a fiber optic system, the optical signals are usually coupled (e.g., at the chip edge) between input and output fiber optics and the on-chip waveguides, leading to concerns about the device's end-to-end insertion loss.

Since the mode of a waveguide can extend past the core as an evanescent tail, the mode in one waveguide may actually excite a field in a neighboring waveguide. The mathematics that describes this coupling is known as coupled mode theory. The effects can be harmful, causing closely spaced waveguides to couple into one another and destroying the original intention of a device. However, the effects can also be useful. In particular, coupled mode theory can be used to spread light from the input waveguide to the entire array in a uniform or Gaussian distribution.

SUMMARY OF THE INVENTION

According to one aspect of the invention, there is provided an AWG device. The AWG device includes a plurality of arrayed waveguides positioned close to each other. An input signal excites one of these coupled waveguides and the power is then transferred to all of the arrayed waveguides. There are enough degrees of freedom in the device to achieve any desired distribution.

According to another aspect of the invention, there is provided a method of performing AWG-based operations on an input signal. The method includes providing a plurality of arrayed waveguides positioned close to each other so there are enough degrees of freedom to achieve any desired distribution. Also, the method includes exciting one of these arrayed waveguides using the input signal so the power is then transferred to all of the arrayed waveguides.

BRIEF DESCRIPTION OF THE DRAWINGS

FIGS. 2A-2B are graphs demonstrating properties of Bessel functions and coupled mode theory;

DETAILED DESCRIPTION OF THE INVENTION

Figure 1:
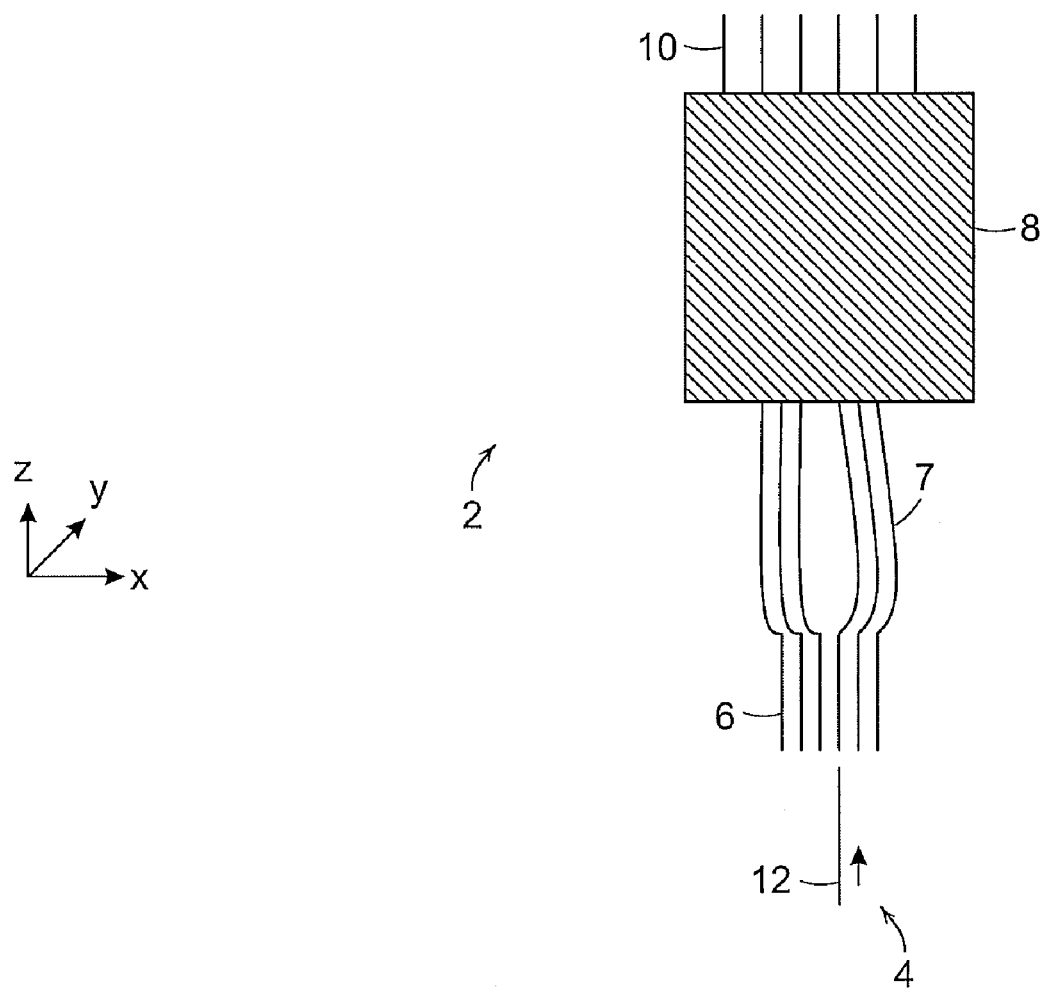
FIG. 1 is a schematic diagram illustrating the inventive AWG design.

As shown in FIG. 1, the inventive AWG 2 uses an array of coupled waveguides 6 as the input combiner instead of a free space region or 1×N MMI coupler. Also, the coupled waveguides 6 provide their output to an output coupler 8, which also includes output waveguides 10. Note the coupled waveguides 6 are bent into a dispersive array 7 where the coupled waveguides 6 are far enough apart so that they don't couple significantly. The detailed operations of the output coupler 8 will be described in more detail hereinafter. An input signal 4 from input waveguide 12 excites one of these coupled waveguides 6, and the power is then transferred to all of them before entering the dispersive array 7 as usual. There are enough degrees of freedom in the system to achieve any desired distribution, providing a great deal of control over the final output of the AWG. Such large scale use of coupled waveguides has not been accomplished before, especially in the context of an AWG.

The basics of coupled mode theory, including an interesting solution to the excitation of one waveguide in an infinite, uniformly coupled array need to be described to establish the principles required to accomplish the invention.

Note the inventive AWG includes N adjacent single mode waveguides aligned along the z direction. The evanescent tails of the modes of these waveguides interact with the other waveguides and create a coupling situation. When the waveguides are spaced far apart, this coupling is negligible. However, when the waveguides are closely spaced, the coupling can be significant.

To study this coupling, first define the mode of the $n^{th}$ waveguide to have profile $E_n(x)$ and propagation constant $\beta_n$:

$$E_n(x,z) = E_n(x)e^{-j\beta_n z} \qquad \text{Eq. 1.}$$

It is assumed that these modes are normalized to have unit power. The following expression calculates the time averaged power of one mode:

$$\frac{1}{2}\int E_{yn}H_{zn}^* dxdy = \frac{\beta_n}{2\omega\mu_0}\int E_n^* E_n dxdy = 1 \qquad \text{Eq. 2}$$

where $E_{yn}$ is the electric field of the mode in the y direction. It is the same as the profile $E_n$, $H_{zn}^*$ is the complex conjugate of the magnetic field of the mode in the z direction, $\omega$ is frequency, $\mu_0$ is permeability of free space, and $E_n^*$ is the conjugate of $E_n$.

Moreover, it is assumed that the modes of different waveguides are orthogonal. Putting this fact together with Eq. 2, the following condition is obtained $$\int E_m^* E_n dxdy = \frac{2\omega\mu_0}{\beta_n}\delta_{mn} \qquad \text{Eq. 3}$$

where $\delta_{mn}$ is the Kronecker delta function, which is zero if m does not equal n, and one if m equals n. This is the orthogonality condition.

The wave equation for the total field is $$\nabla^2 E(x,z) + \omega^2\mu_0\epsilon E(x,z) = 0 \qquad \text{Eq. 4}$$

where $\epsilon$ is permittivity.

Note the TE polarization is used throughout, so this field is in the y direction. Also, the solution to the equation must be some superposition of the original modes:

$$E(x,z) = \Sigma a_n E_n(x) e^{-j\beta_n z} \qquad \text{Eq. 5}$$

where $a_n$ is the amplitude of the nth mode.

Using Eq. 5 and applying it into Eq. 4, the following relationship is found:

$$\sum\left(\frac{d^2 a_n}{dz^2} - 2j\beta_n\frac{da_n}{dz} + \omega^2\mu_0(\epsilon - \epsilon_n)a_n\right)E_n e^{-j\beta_n z} = 0 \qquad \text{Eq. 6}$$

where $\epsilon = \epsilon(x)$ is the permittivity distribution for the whole structure, while $\epsilon_n$ is the permittivity for waveguide n only, as if the other waveguides are not present. The second order derivative terms can be ignored in this expansion if the fields are assumed to be changing only slowly in the z direction. Eq. 6 is multiplied by $E_m^*$, the conjugate of the $m^{th}$ mode, and integrated over the entire structure:

$$\sum\left(-2j\beta_n\frac{da_n}{dz}\int E_m^* E_n dxdy + \omega^2\mu_0 a_n\int(\epsilon-\epsilon_n)E_m^* E_n dxdy\right)e^{-j\beta_n z} = 0. \qquad \text{Eq. 7}$$

From Eq. 3, the first term in the sum is nonzero only if m=n. The following equations are obtained $$\frac{da_m}{dz}e^{-j\beta_m z} = \sum\left(-j\frac{\omega}{4}a_n\int(\epsilon-\epsilon_n)E_m^* E_n dxdy\right)e^{-j\beta_n z} \qquad \text{Eq. 8}$$

-continued $$\frac{da_m}{dz} = \sum \kappa_{mn} a_n e^{-j\Delta\beta_{nm}} \qquad \text{Eq. 9}$$

where $\kappa_{mn}$ is the coupling coefficient between waveguides m and n is defined as $$\kappa_{mn} = -j\frac{\omega}{4}a_n\int(\epsilon-\epsilon_n)E_m^* E_n dxdy. \qquad \text{Eq. 10}$$

The case when m=n, which describes a perturbation to the mode of a waveguide from the presence of other waveguide structures, is ignored for this computation. Also, the coupling coefficients for all waveguides, which are not nearest neighbors, are ignored. That is, it is assumed $\kappa_{mn}=0$, $m \neq n\pm 1$. For a TE slab waveguide, the coupling coefficient between two waveguides is:

$$\kappa = -j\frac{\gamma k_x^2}{(k_x^2+\gamma^2)(\beta d + \beta/\gamma)}e^{-\gamma(D-2d)} \qquad \text{Eq. 11}$$

where $k_x$ is the transverse wavevector. D is the separation between the centers of the two slabs. Note the exponential dependence of the coupling coefficient on separation distance, due to the exponentially decaying nature of the cladding field.

$\Delta\beta_{nm}$ is the relative detuning of propagation constants between waveguides. In particular, $\Delta\beta_{nm} = \beta_n - \beta_m$. Waveguide couplers with identical waveguides are considered, so $\Delta\beta_{nm}=0$. It would perhaps be interesting to investigate the effects of detuning in such large scale couplers, since it would provide an extra N−1 degrees of freedom. However, for simplicity, such effects are ignored.

The best way to solve the coupled mode problem is to use eigenvalue methods as applied to differential equations. The system of differential equations being solved is $$\frac{da}{dz} = Ka \qquad \text{Eq. 12}$$

where a is the vector of mode amplitude coefficients for each waveguide. K is the matrix of coupling coefficients, which is nonzero only for elements with indices m and n satisfying m=n±1:

$$a = \begin{bmatrix} a_1 \\ a_2 \\ * \\ * \\ * \\ a_N \end{bmatrix} \qquad \text{Eq. 13}$$

-continued $$K = \begin{bmatrix} 0 & \kappa_1 & * & * & 0 & 0 \\ \kappa_1 & 0 & * & * & 0 & 0 \\ * & * & * & * & * & * \\ * & * & * & * & * & * \\ * & * & * & * & * & * \\ 0 & 0 & * & * & 0 & \kappa_{N-1} \\ 0 & 0 & * & * & \kappa_{n-1} & 0 \end{bmatrix}. \qquad \text{Eq. 14}$$

The key to solving the system is to assume solutions with z dependence $e^{-j\beta z}$. Then the system of equations is $$-j\beta a = Ka \qquad \text{Eq. 15}$$

Hence it is an eigenvalue problem with eigenvalue $-j\beta$. To solve it, the eigenvalues of the matrix K are found along with the corresponding eigenvectors. These eigenvectors give the coefficients $a_n$ for the expansion of the eigenmodes as a superposition of the individual waveguide modes. The original modes of the individual waveguides no longer propagate unchanged along z, but these new eigenmodes, often called supermodes, do. The complete solution to the field at some point z is given by a weighted sum of these supermodes, each multiplied by the corresponding phase factor $e^{-j\beta z}$:

$$E(x,z) = \Sigma c_i \phi_i(x) e^{-j\beta_i z} \qquad \text{Eq. 16}$$

where $\phi_i(x)$ are the supermodes, and $c_i$ are the weighting factors. These are determined by the initial conditions. With the right initial conditions, as many of the modes as desired can be excited.

The inventive AWG is made up of an array of coupled waveguides. It is believed such a structure can offer better performance than an MMI for several reasons. To begin with, one of the failures of the MMI is the phase error accumulated due to high numbered modes propagating at large angles. This effect causes increased loss and, more importantly, errors in the overall phase which show up again as crosstalk in the output. A system of coupled waveguides is a much more controllable system. Loss in such a system should be minimal, while the phase at the output will be well known. Any approximations made in the design of a coupled waveguide system should have only little effect on the output, unlike the large errors that are found in the MMI.

In addition, the MMI AWG also suffers from crosstalk because the number of array waveguides can only be as large as the number of outputs. The sampling of the field by the array can be considered a windowing of an infinite impulse response filter. To better approximate the desired frequency response, more array waveguides are needed. With a coupled waveguide system, incoming power can be distributed over as many waveguides as is needed.

Another traditional way of performing the input coupling in an AWG is the use of a free space region. Such a design naturally has less crosstalk due to the lack of large phase errors and the ability to use more array waveguides. Yet the free space coupler still features a great deal of loss and is difficult to control precisely. The coupled waveguide solution features low loss and extra degrees of freedom to fine tune the device response. Unfortunately, the coupled waveguides cannot be used as the output of the AWG, because the necessary interference condition at different output ports cannot be engineered. Thus a free space coupler is used as the output structure. However, if the response of the output is nonideal, simple adjustments can be made in the coupling coefficients of the input to attempt to fix the problem.

The essential problem is simple. The goal is to find the set of coupling coefficients κ which produce certain output distributions at a given z in a coupled waveguide array. Solving this problem directly is incredibly difficult. Examining Eq. 16, it is nontrivial to solve for the matrix K given the field at z=0 and at some other z=z'. Instead, an interesting analytic solution to the coupled waveguide problem is examined and then its results are modified until the desired result is achieved.

Consider the Bessel function identity $$2\frac{dJ_n}{dz} = J_{n-1} - J_{n+1}. \qquad \text{Eq. 17}$$

This equation looks very similar to the coupled mode equations (for uniform nearest neighbor coupling):

$$\frac{da_n}{dz} = j\kappa a_{n-1} + j\kappa a_{n+1}. \qquad \text{Eq. 18}$$

Note the complex factor j is taken out of the definition of κ to better emphasize the nature of the phase shift between waveguides, an issue which will be discussed in more detail later. If the substitution $a_n = j^n J_n$ is made, the following relationships are obtained $$j^n \frac{dJ_n}{dz} = jj^{n-1}\kappa J_{n-1} + jj^{n+1}\kappa J_{n+1} \qquad \text{Eq. 19}$$

$$\frac{dJ_n}{dz} = \kappa J_{n-1} - \kappa J_{n+1}. \qquad \text{Eq. 20}$$

If κ=½, the relation of Eq. 17 is recovered. This shows that for a constant coupling coefficient of ½, if waveguide 0 at z=0 is excited, the mode amplitude for waveguide n at distance z is equal to $J_n(z)$. In fact, κ=½ is not required; scaling κ just (inversely) scales the distance z over which coupling occurs. So any constant coupling coefficient produces amplitude distributions that go like Bessel functions in z.

Figure 2A:
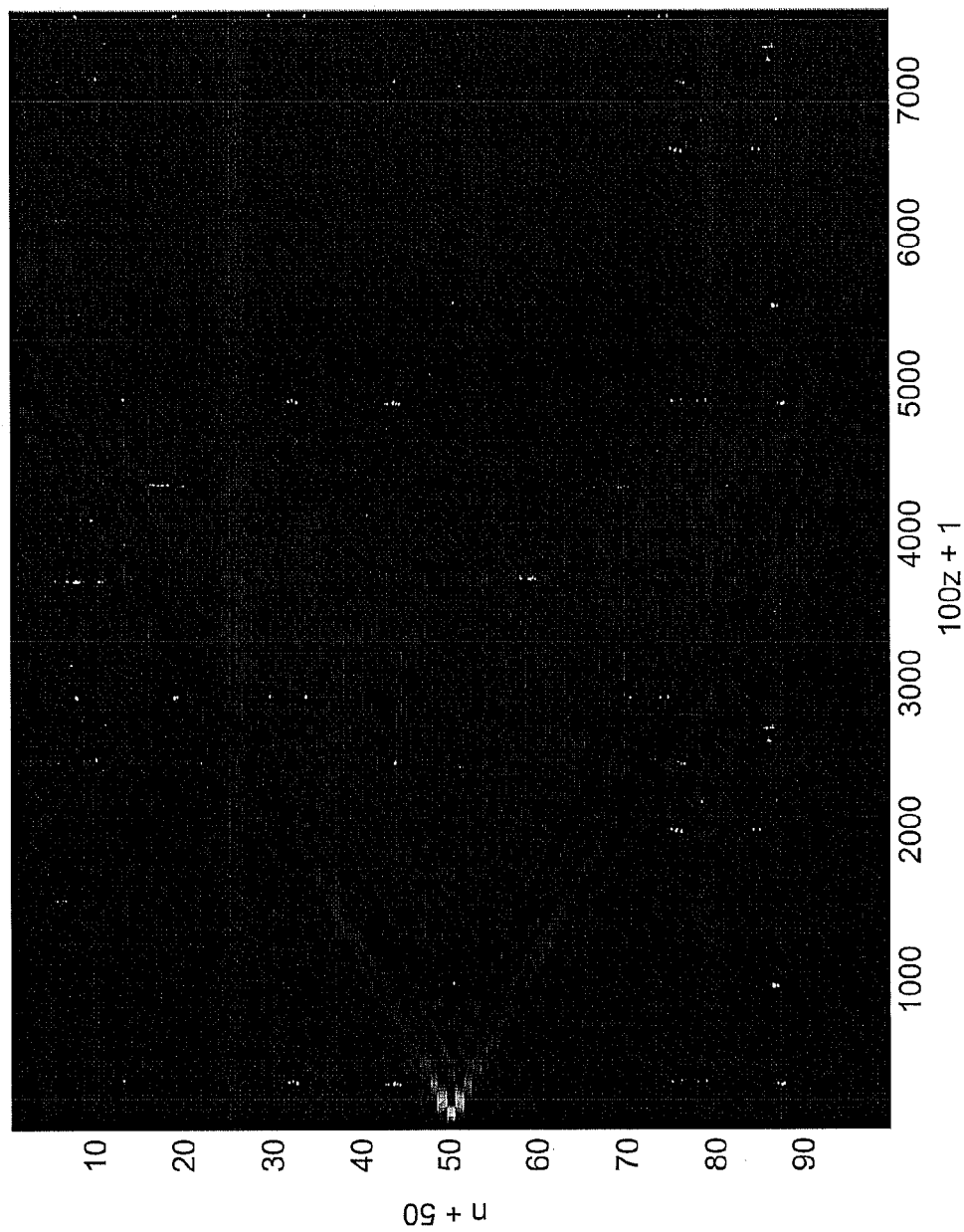

FIG. 2A shows a plot of the Bessel relation for 99 waveguides. Each row is a waveguide, and the colors represent the magnitude of the Bessel function squared.

FIG. 2B shows the response of the 99 waveguides, as discussed in FIG. 2A, coupled with κ=½ when the center waveguide is excited. It is clear that the basic pattern is the same as the Bessel functions. Some slight differences do occur at the edges because the Bessel relation (Eq. 17) requires an infinite set of Bessel functions. Thus, uniformly coupled waveguides only follow the Bessel function pattern perfectly if there is an infinite set of waveguides.

For a finite number of waveguides N, an analytic solution can still be found. Only the case of N being odd is considered so the structure can be excited from the center, but the argument can be generalized. The finite number of waveguides is handled by treating the ends of the coupler as mirrors. This can be simulated in a system of infinite waveguides by first placing a negative dummy source into waveguides N+1 and −(N+1). These sources cancel the excitation of the real input in waveguides (N+1)/2 and −(N+1)/2, respectively, making it seem as if the waveguide array ends at those points with just N total guides. However, the new source in waveguide N+1 will also create an unwanted excitation in waveguide −(N+1)/2, so another positive source is needed to cancel this contribution. In order to fully cancel the field in the (N+1)/2 and −(N+1)/2 waveguides, an infinite array of alternating positive and negative dummy sources is needed. The field in any waveguide can then be written as the sum of the Bessel contributions from each of these sources. For example, the response of the center waveguide of a uniformly coupled three waveguide system (excited in the center) can be written as $$a_0(x) = J_0(z) - J_4(z) - J_{-4}(z) + J_8(z) + J_{-8}(z) + \quad \text{Eq. 21}$$

Figure 3:
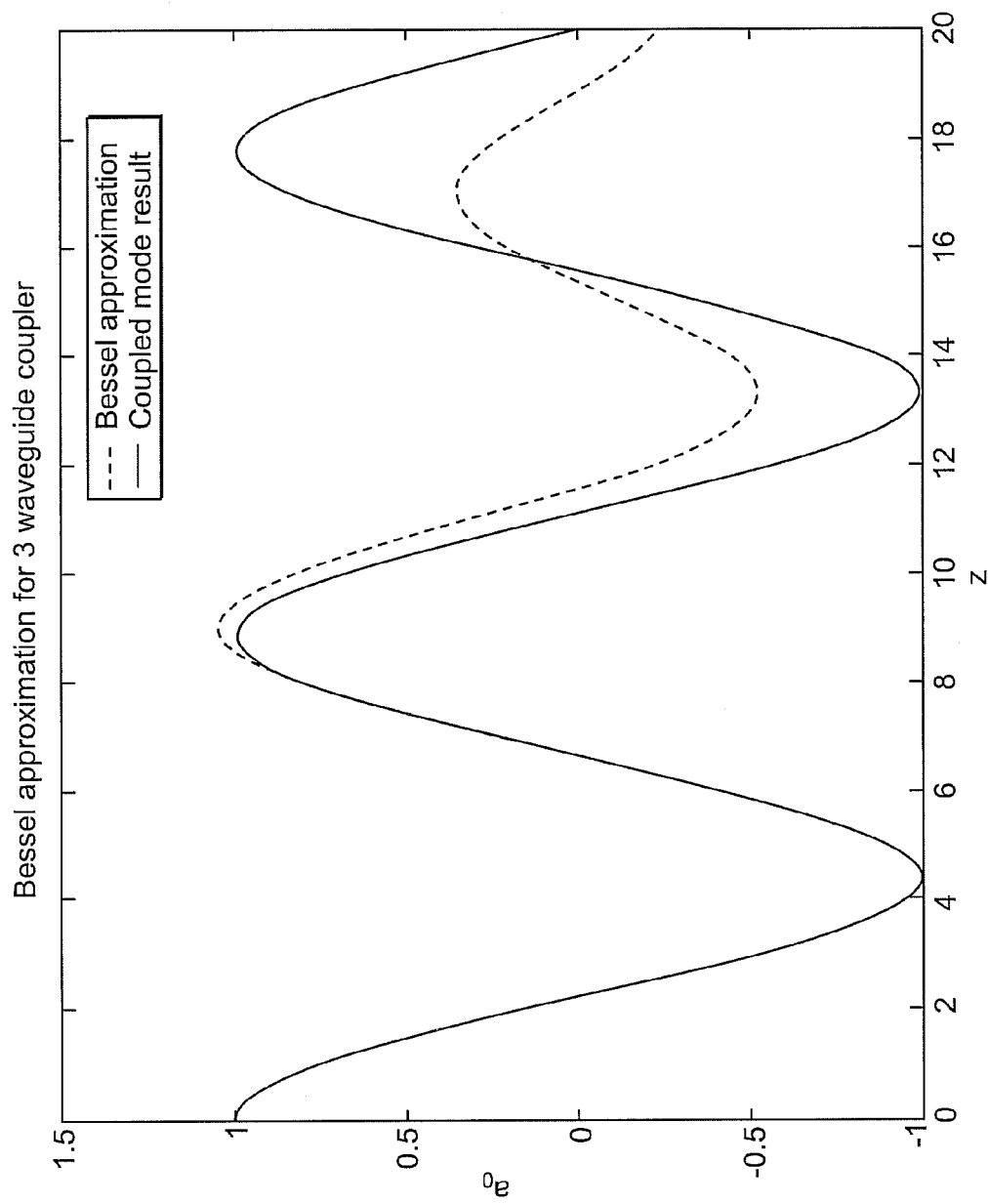
FIG. 3 is a graph demonstrating a coupled mode solution to a centrally excited three-waveguide system compared to approximations by sums of Bessel functions.

FIG. 3 shows the actual response for this waveguide using coupled mode theory, as well as the Bessel approximation using the first five terms above. It is clear that the Bessel formula works well for a while, but at larger z, more Bessel functions need to be used to obtain an accurate solution.

Newton's method is used to calculate the coupling coefficients which will produce a desired profile, given an initial guess obtained through trial and error. The technique begins by calculating the output at a given distance for an initial guess $\kappa$ of the coupling coefficients. The resulting waveguide mode amplitudes are denoted $a_n$, but for the rest of the algorithm only the power in each waveguide, $p_n = |a_n|^2$ is of importance. The vector function is defined as $$f(\kappa) = p(\kappa) - p_{desired} \quad \text{Eq. 22}$$

where $p(\kappa)$ is a vector of the calculated powers for the guess $\kappa$ in all waveguides but the center. Note power conservation guarantees that if the other waveguides have the correct output, the center will as well. Said in another way, there are not enough adjustable coefficients to set the amplitudes in each waveguide uniquely. For a uniform profile, $p_{desired}$ is a vector with all elements equal to the value of p in the center waveguide. For the Gaussian profile, each element is equal to the value of a Gaussian at that point. The goal is obviously to achieve $f(\kappa)=0$, i.e., to find the roots of $f(\kappa)$. This equation can be expanded as $$f(k) = f(k^{(m)}) + \nabla f(k^{(m)}) \cdot dk^{(m)} + \ldots = 0 \quad \text{Eq. 23}$$

where m is the iteration number and $\nabla f$ is the Jacobian matrix:

$$\nabla f = \begin{bmatrix} \frac{\partial f_1}{\partial \kappa_1} & \frac{\partial f_1}{\partial \kappa_2} & \cdots & \frac{\partial f_1}{\partial \kappa_n} \\ \frac{\partial f_2}{\partial \kappa_1} & \frac{\partial f_2}{\partial \kappa_2} & \cdots & \frac{\partial f_2}{\partial \kappa_n} \\ \vdots & \vdots & \cdots & \\ \frac{\partial f_n}{\partial \kappa_1} & \frac{\partial f_n}{\partial \kappa_2} & \cdots & \frac{\partial f_n}{\partial \kappa_n} \end{bmatrix} \quad \text{Eq. 24}$$

where the subscripts indicate elements of f and $\kappa$. This matrix can be calculated by changing each element of the current guess of $\kappa$ by a small amount, recalculating f, and then estimating the derivatives using a first difference.

The vector $d\kappa$ is the correction which should be applied to create the next guess for $\kappa$. It is calculated by solving the matrix equation (Eq. 23):

$$\nabla f(\kappa^{(m)}) \cdot d\kappa^{(m)} = -f(\kappa^{(m)}). \quad \text{Eq. 25}$$

Then the correction $d\kappa$ is added to $\kappa$ to create a new guess:

$$\kappa^{(m+1)} = \kappa^{(m)} + d\kappa^{(m)} \quad \text{Eq. 26}$$

and the process begins again. It is repeated until $\kappa$ converges.

Figure 4A:
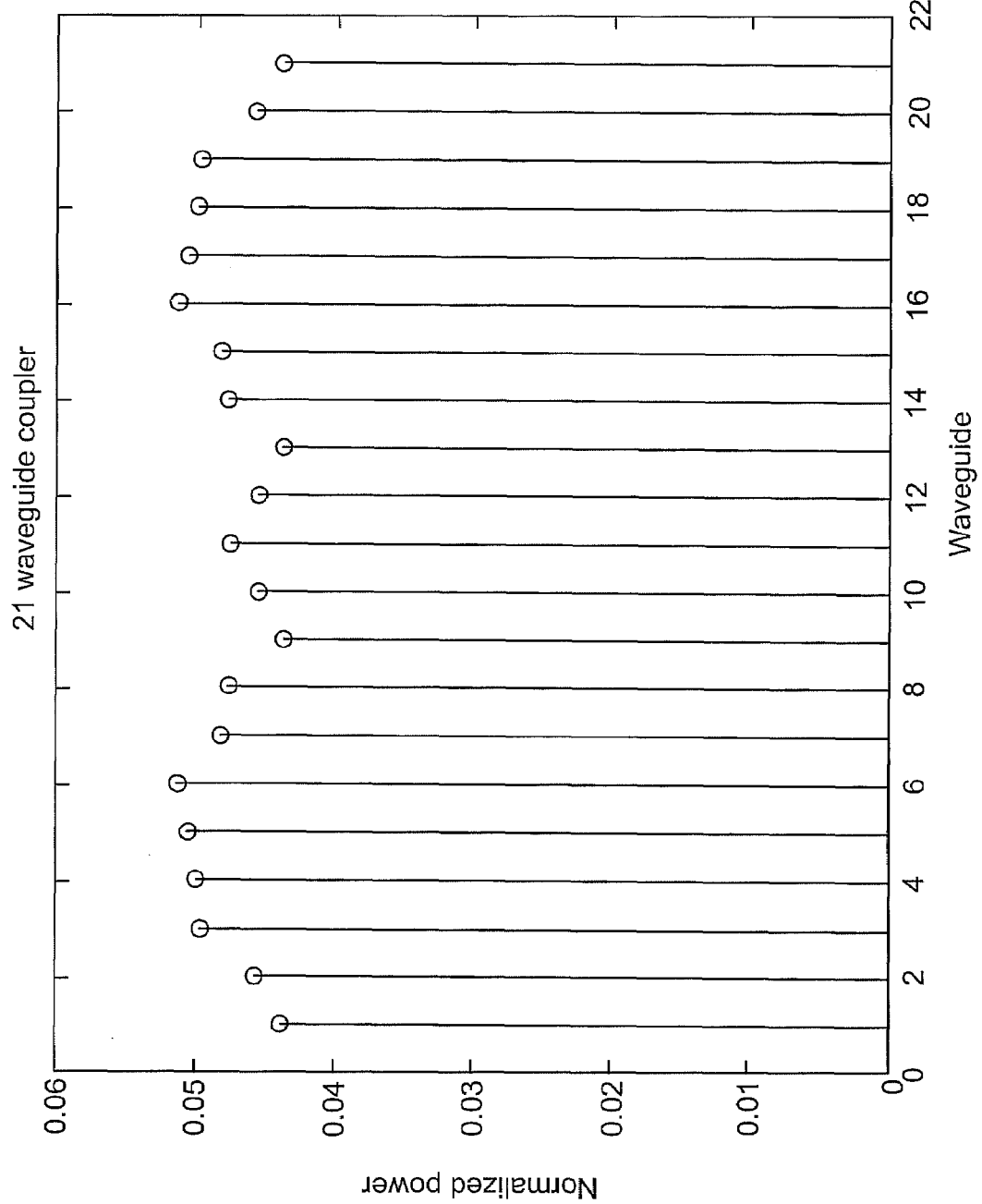
FIGS. 4A-4B are graphs demonstrating the advantages of Newton's method in optimizing the design.
Figure 4B:
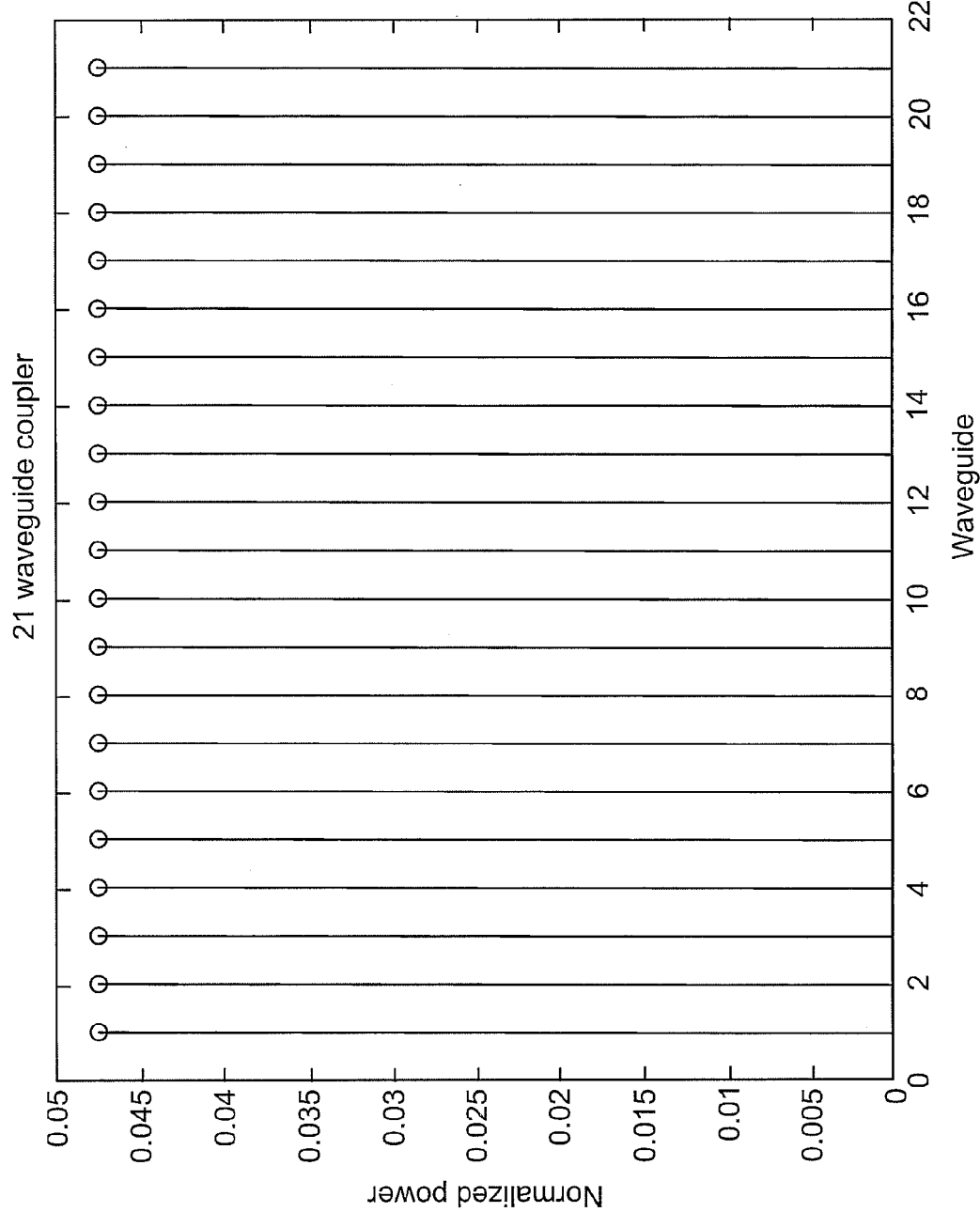

The first amplitude profiles that were generated had constant power across all the waveguides. The coupling coefficients are found for 3, 5, 7, 21, 31, and 41 waveguides. Note an odd number is used so one can launch from the center and take advantage of symmetry. For 3 waveguides, the problem is trivial. The two coupling coefficients are the same, and constant power distribution always occurs at some z. For the other cases, many iterations are run by hand before turning to Newton's method for a more exact solution. For example, FIG. 4A shows the best attempt at a uniform power profile by trial and error adjustment of the coupling coefficients. FIG. 4B shows the optimized profile, after Newton's method is applied to the best guess.

Figure 5:
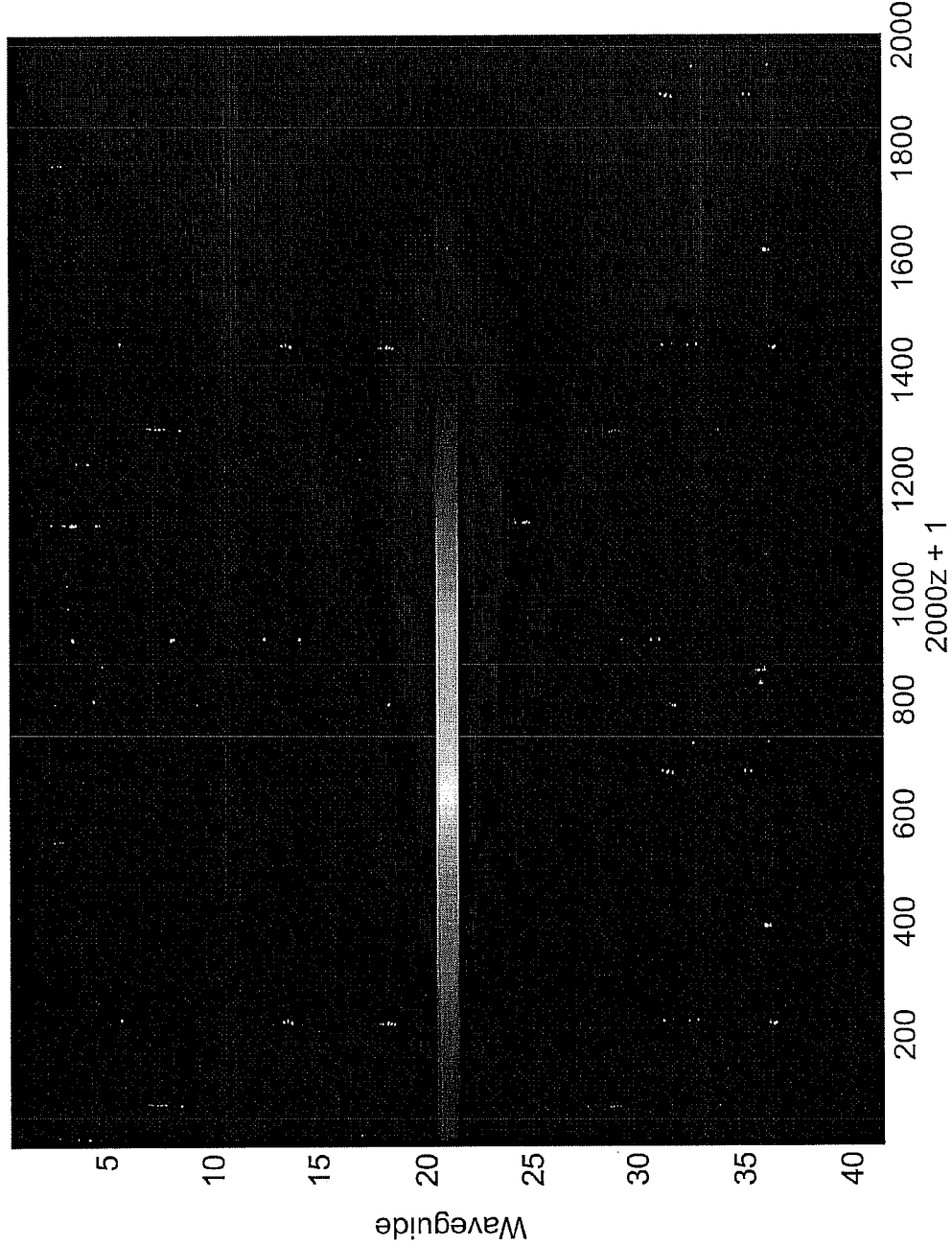
FIG. 5 is a graph demonstrating power in a waveguide coupler.
Figure 6:
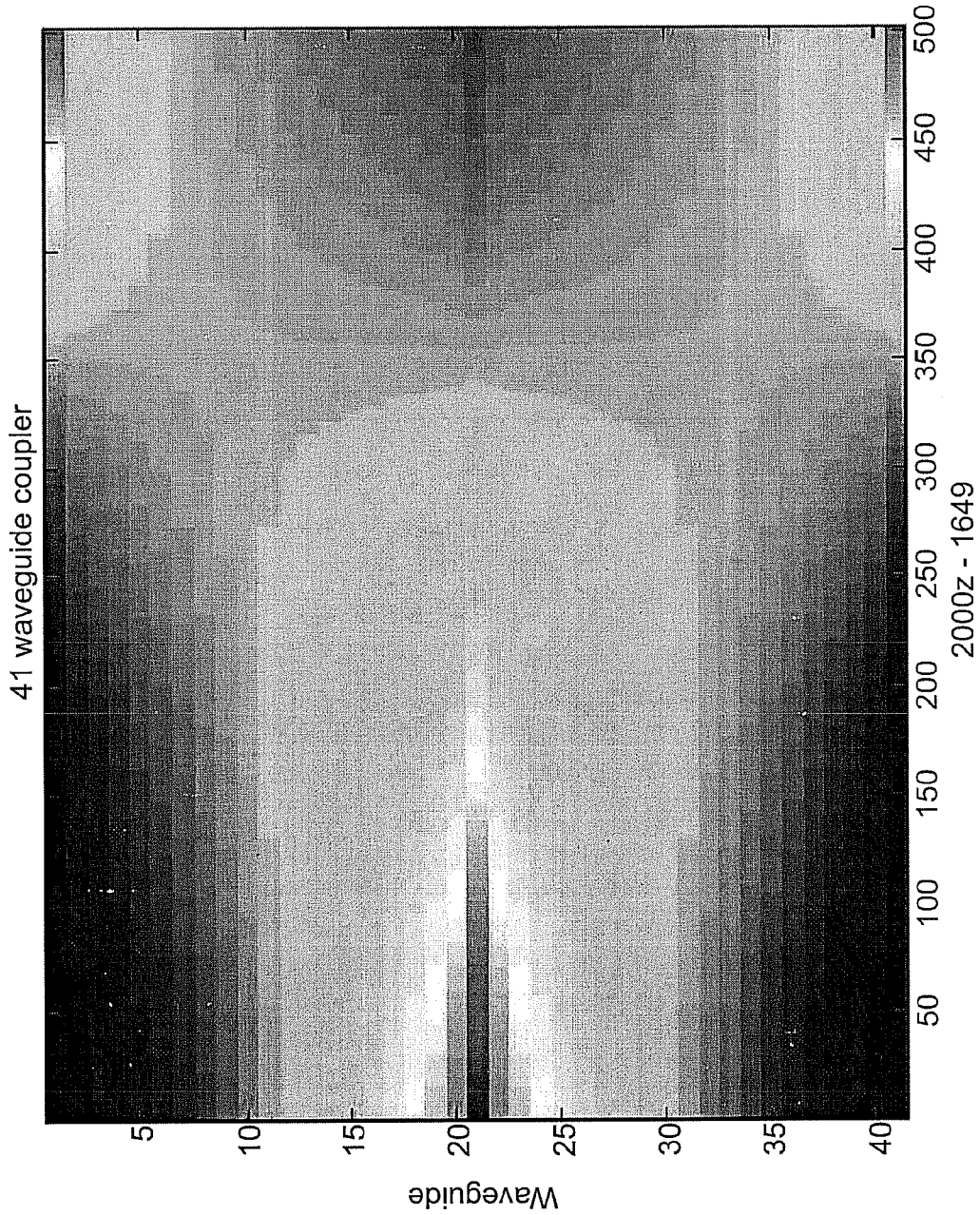
FIG. 6 is a zoom-in graph of FIG. 5 demonstrating power around z=1.

FIG. 5 shows the power in all 41 waveguides of the 41 waveguide coupler from z=0 to z=1, where the uniform profile occurs. Actually, in the original determination of the coupling coefficients, the uniform profile is found at a convenient z given that the trial and error process started at the Bessel function result. For purposes of later analysis, the coupling coefficients are then adjusted to place the desired output at z=1. FIG. 6 shows the same picture, zoomed in on the area around z=1.

The FIGS. 5 and 6 show how the coupling is at first small near the center and then becomes larger away from the center. This is clear from the constant coupling case (see FIG. 2B), which shows that power is coupled easily into waveguides near the center but takes a long time to reach the outside guides.

Figure 7:
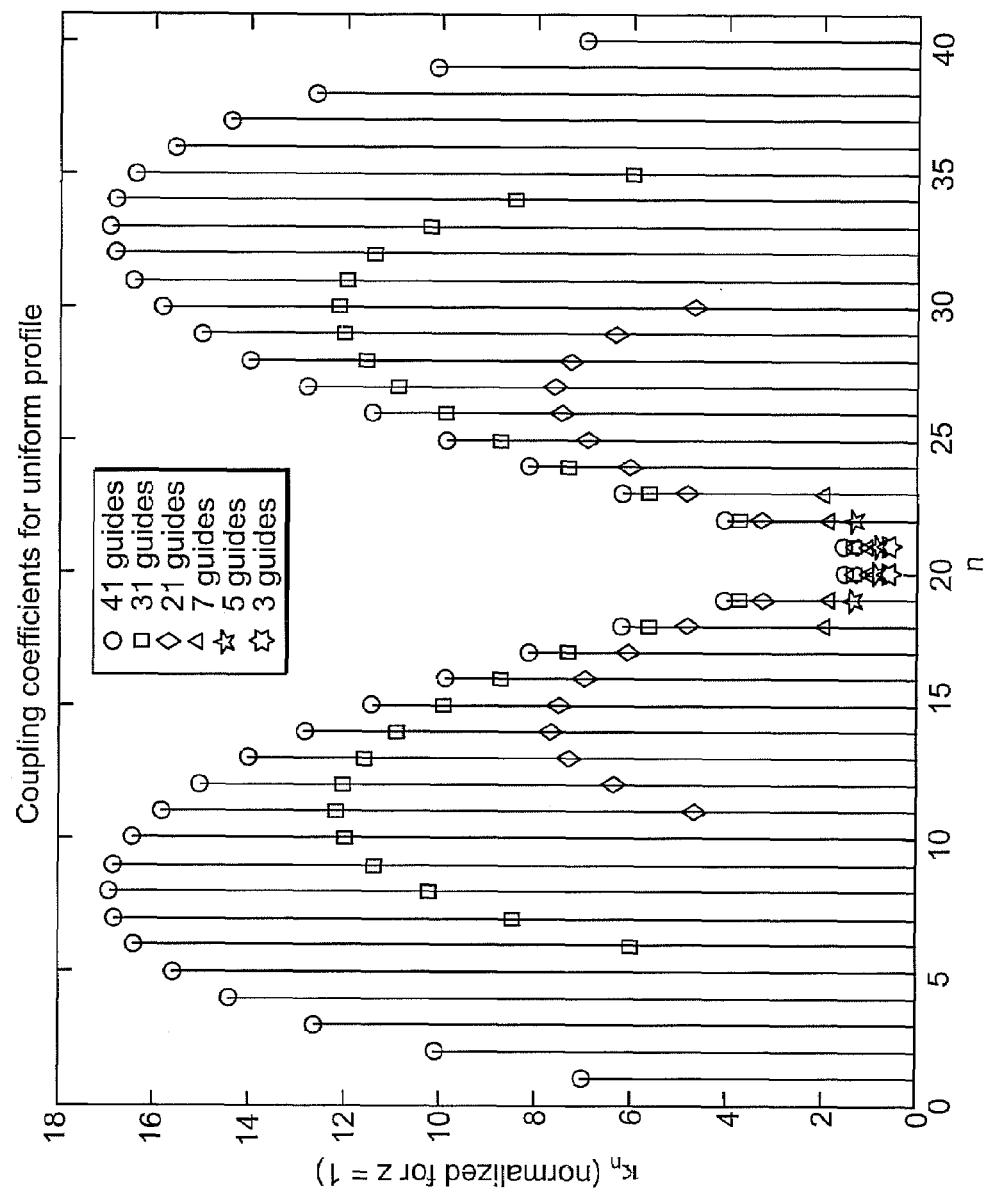
FIG. 7 is a graph demonstrating coupling coefficients for uniform profile couplers.

FIG. 7 shows coupling coefficients for uniform profile couplers. A uniform profile coupler like these could potentially be very useful. Previously, waveguide couplers were generally used only for a few ports, while other devices were used to realize couplers requiring a larger number of ports. Free space star couplers are perhaps the most common devices, but much effort is required in order to obtain a uniform response in the output. MMIs often have excellent uniformity, but their performance breaks down for small, high index contrast devices. In addition, the number of ports is limited in an MMI. It is clear that large N waveguide couplers have the potential to be quite useful in their own right. Furthermore, a uniform coupler could replace the input MMI of the MMI AWG, reducing the phase errors and loss associated with that part of the device.

Figure 8:
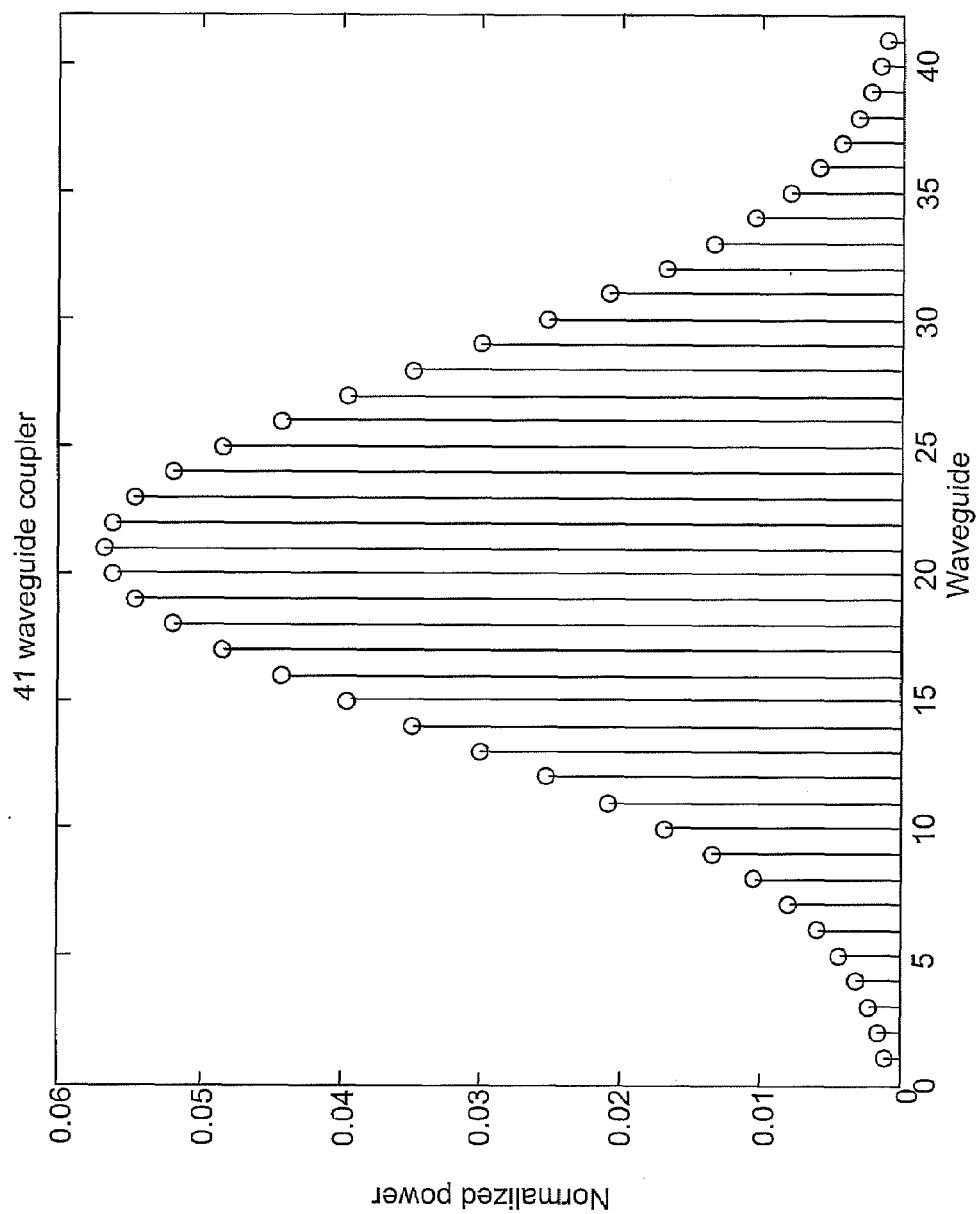
FIG. 8 is a graph demonstrating output of a waveguide coupler with a Gaussian profile.

In order to use a free space output coupler, a Gaussian distribution is desired, which will Fourier transform in the far field to another Gaussian. FIG. 8 shows a Gaussian pattern generated for 41 waveguides following the equation $$p = \frac{1}{17.6587} e^{-\frac{(i-21)^2}{100}} \quad \text{Eq. 27}$$

where i is the waveguide number from 1 to 41 and the numerical constant is for normalization (power conservation).

Figure 9:
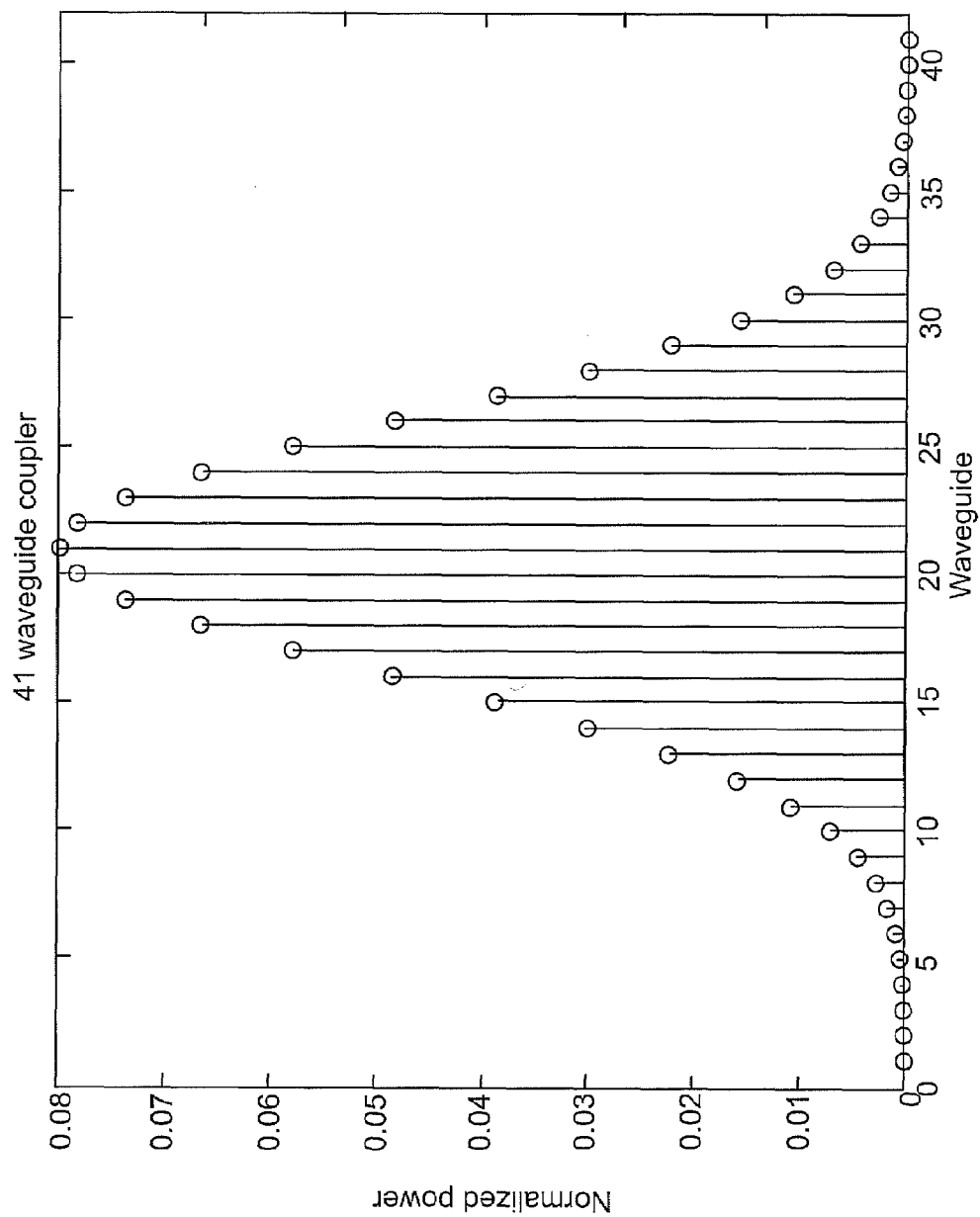
FIG. 9 is a graph demonstrating output of a waveguide coupler with an improved Gaussian profile.

This profile was very promising; however, since it represents a power distribution, the associated field is perhaps a bit too wide. The electric field needs to follow a profile similar to the one in FIG. 8 so that the wings are not too cut off. Therefore, a second Gaussian shape is made, shown in FIG. 9, which is the square of the shape in FIG. 8:

$$p = \frac{1}{12.5326} e^{-\frac{(i-21)^2}{50}}.$$ Eq. 28

Figure 10:
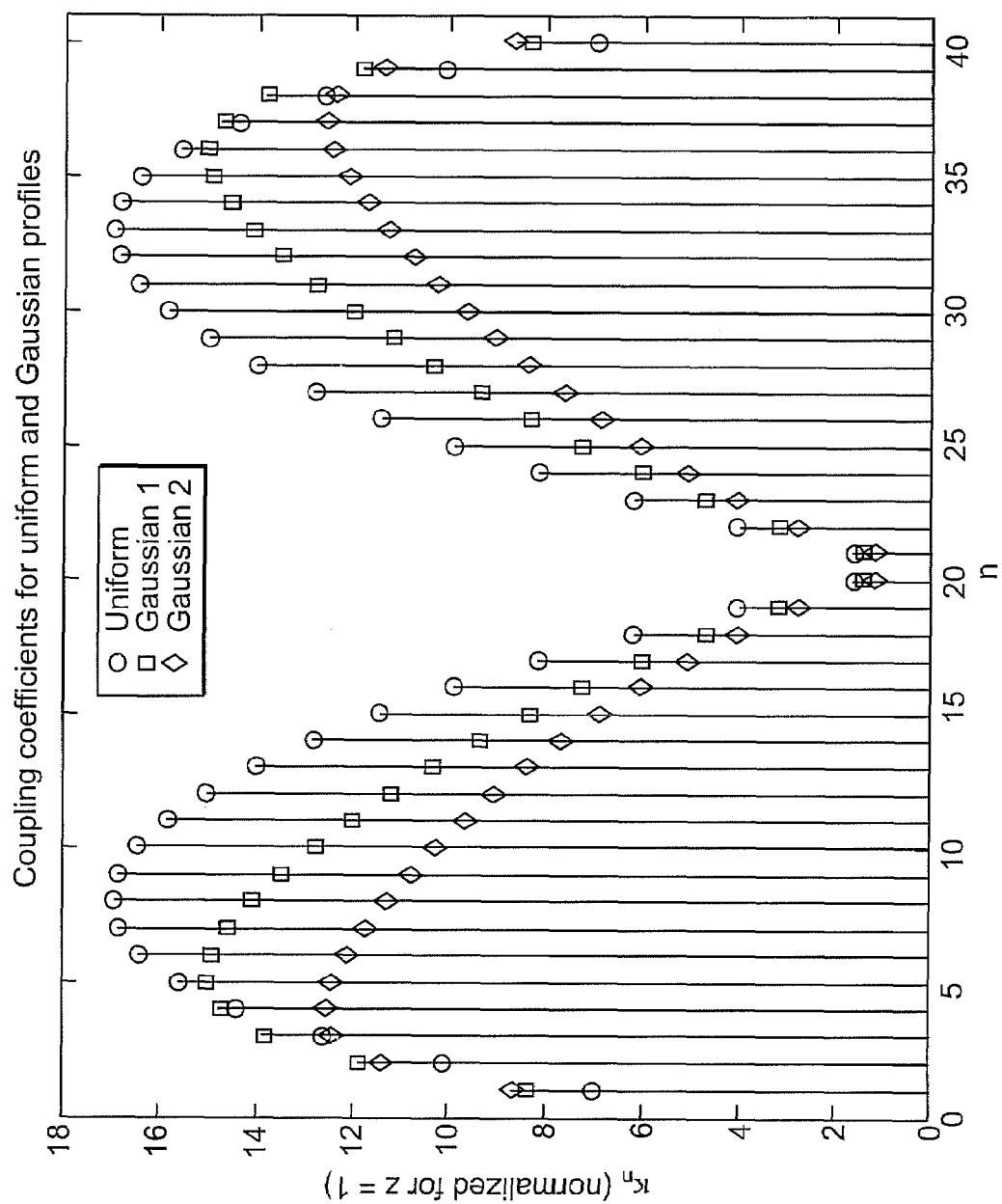
FIG. 10 is a graph demonstrating coupling coefficients for the uniform coupler and two Gaussian couplers.

FIG. 10 shows the coupling coefficients for the 41 waveguide uniform coupler, as well as the two Gaussian couplers. The Gaussian coefficients follow the same basic pattern as the uniform ones, increasing farther away from the center before finally dropping off slightly. As expected, the Gaussian pattern does not need as much coupling as the uniform pattern (and the thinner Gaussian requires less than the wider Gaussian), but it is interesting that the Gaussian coefficients are still more similar to the coefficients for a uniform profile than to the Bessel function case.

Figure 11:
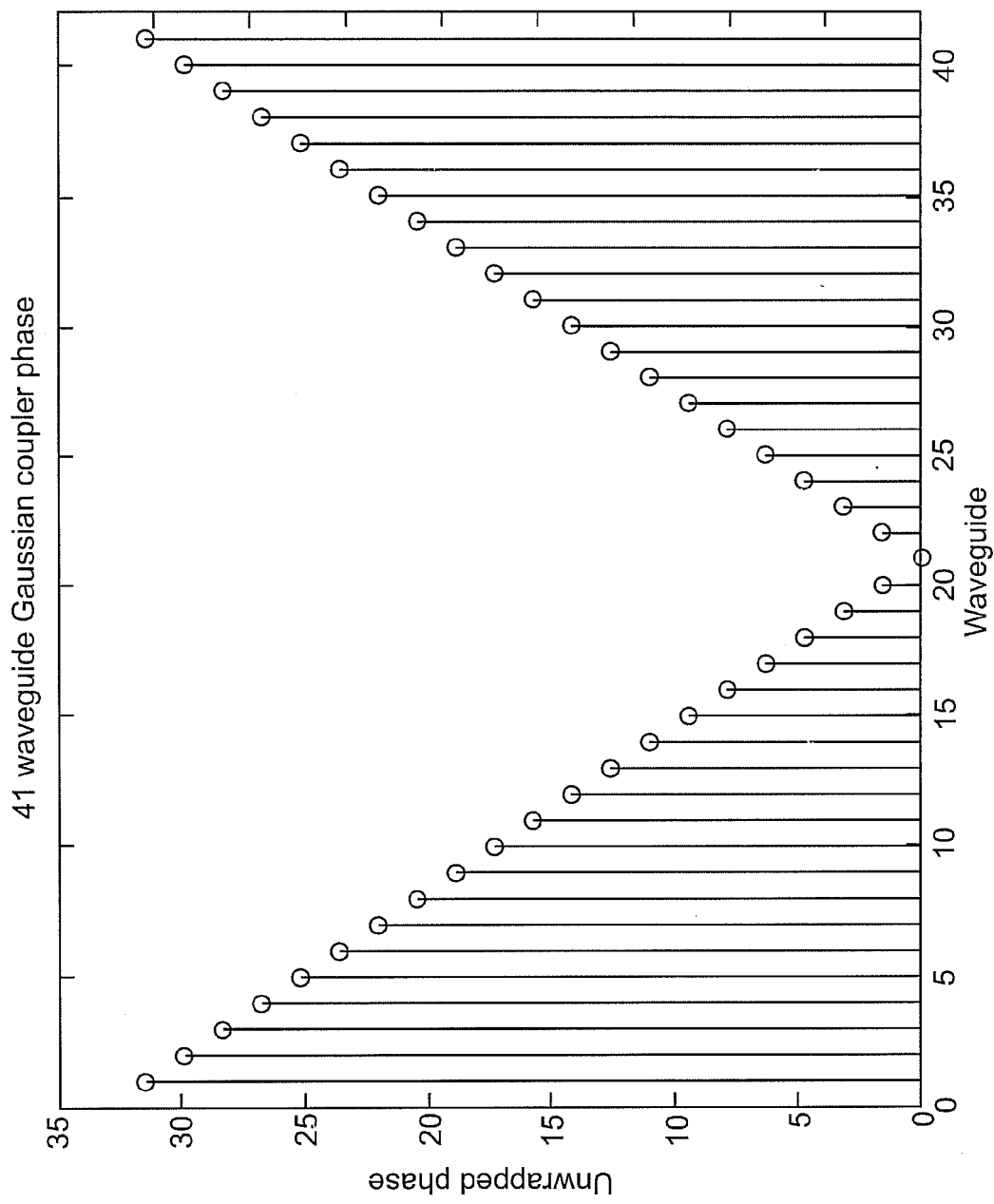
FIG. 11 is a graph demonstrating phase of a Gaussian coupler.

The phase of the waveguide couplers must also be considered. Eq. 18 shows that there is a phase shift of j, or π/2 radians, between a guide and the neighboring guides which it excites. For the 41 waveguide Gaussian coupler of FIG. 9, the phase is depicted in FIG. 11. The slope of π/2 is apparent on both sides of the center waveguide.

This phase profile unfortunately creates a problem for the design of an AWG. To achieve wavelength multiplexing with a free space output coupler, the center wavelength needs to be completely in phase at the entrance to the coupler so that it will focus to the center output waveguide. To accomplish this, the phase of the input coupler could be removed by propagating the light through different lengths in an uncoupled region. However, the other wavelengths would exit with a phase that is still proportional to the phase in FIG. 11. But these wavelengths need to contain a linear (asymmetric) phase profile in order to focus them to different output waveguides.

One simple way to fix this problem is to excite the waveguide coupler not at the center waveguide, but at one of the end waveguides. In this case the phase will grow by π/2 in neighboring waveguides, but this effect will only propagate in one direction, creating a line antisymmetric about the center waveguide as desired. In order to achieve this phase, the Gaussian coupler is redesigned for excitation from one of the sides. This makes the choice of coupling coefficients more difficult because the symmetry has been destroyed.

Figure 12:
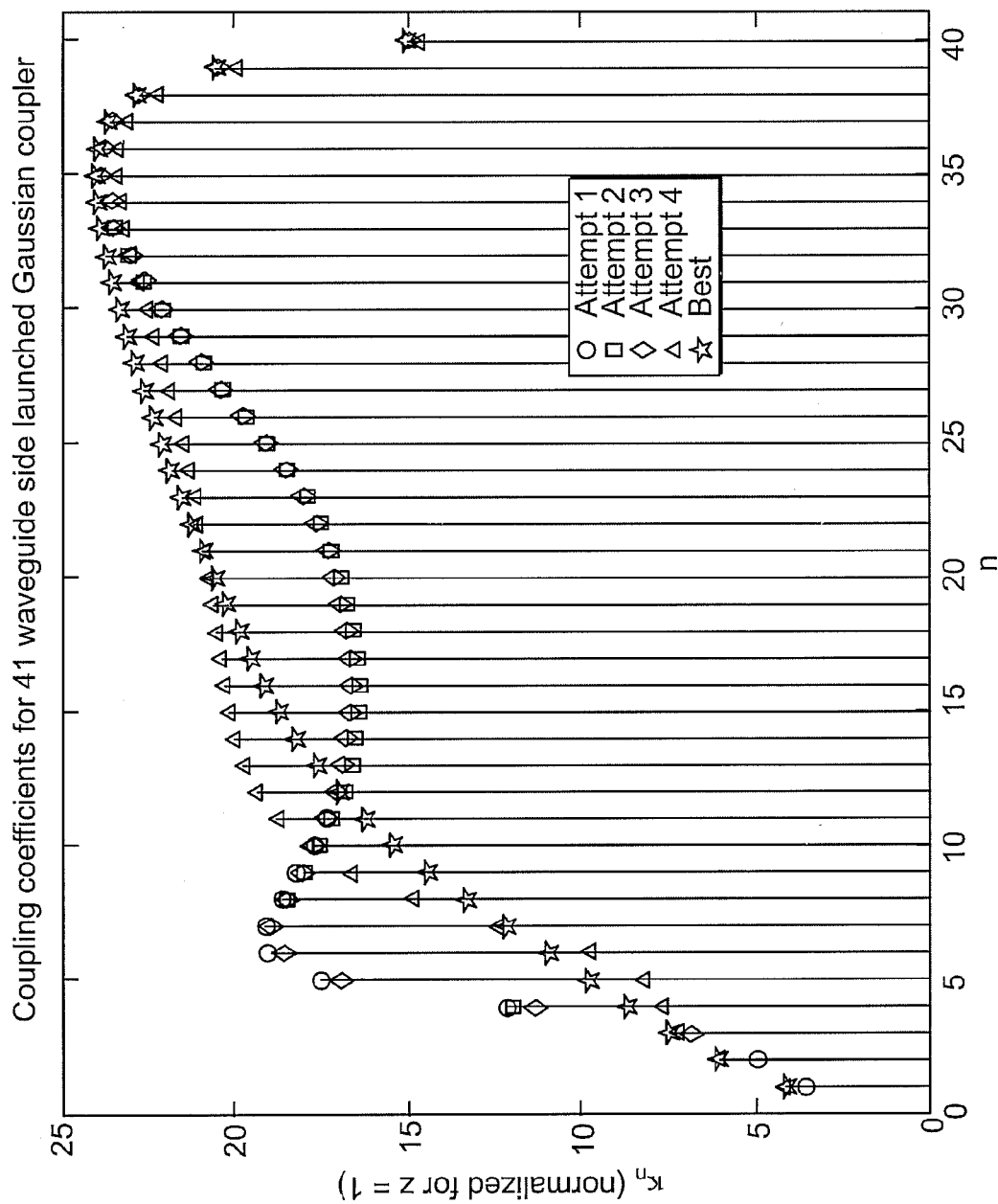
FIG. 12 is a graph demonstrating coupling coefficients for the 41 waveguide side launched Gaussian coupler.
Figure 13:
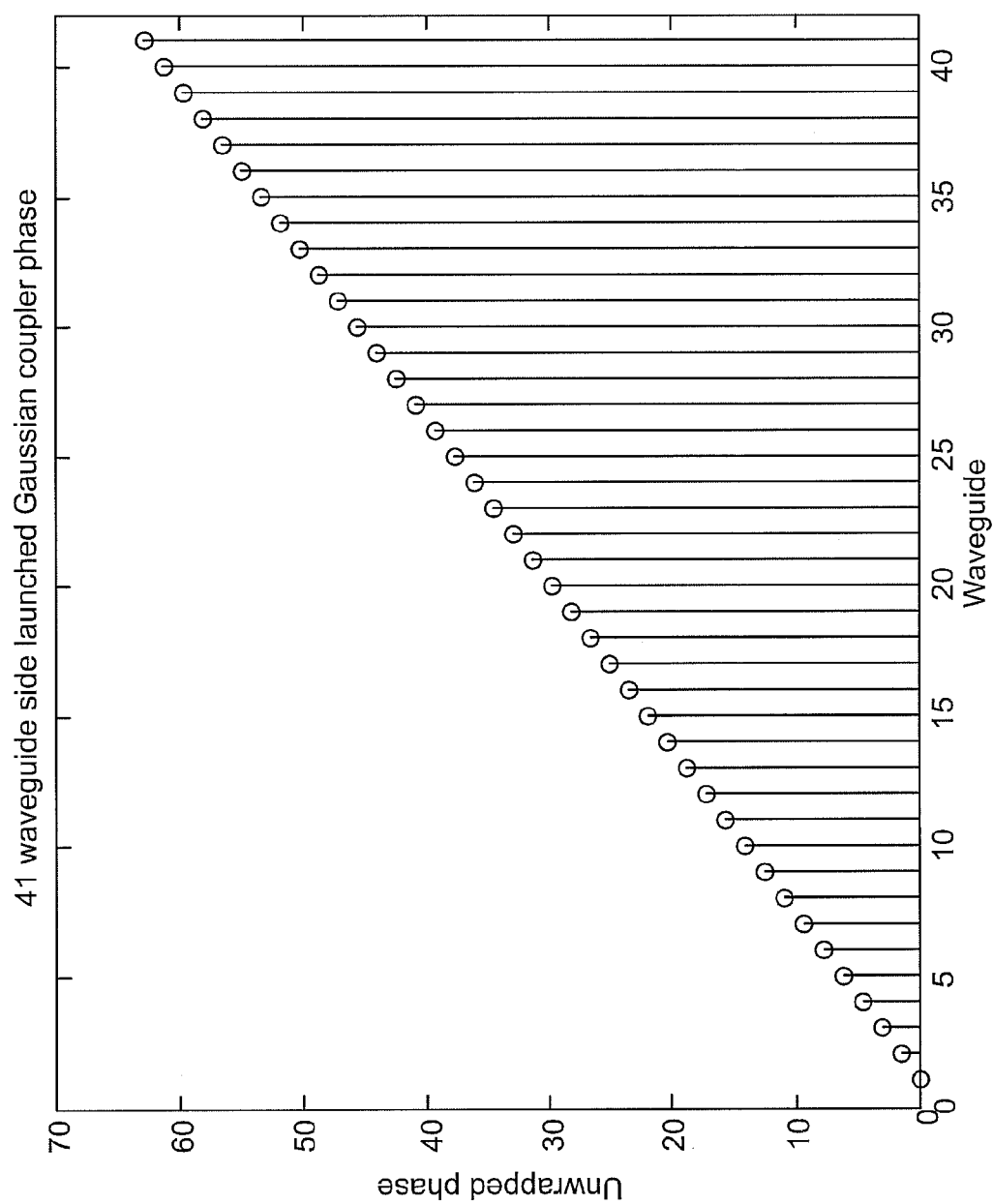
FIG. 13 is a graph demonstrating phase of a 41 waveguide side launched Gaussian coupler.

Still, a 41 waveguide side launched Gaussian coupler is achievable. The coupling coefficients are shown in FIG. 12. Notice that many sets of coupling coefficients gave a Gaussian profile. However, only one gave the desired phase response, shown in FIG. 13. The others had slight problems in the small numbered waveguides, nearest the input, because the field amplitude had gone below zero, giving the desired power but the incorrect phase. The correct answer is found by tweaking the previous, slightly incorrect set of coupling coefficients and inputting them into the Newton's method routine until a new, better solution was found. Note the correct solution looks qualitatively the best, as it is the smoothest and looks the most like the profiles of FIG. 10.

Using Eq. 18, calculations have been made of the distances D between the centers of neighboring waveguides required to achieve the 41 waveguide side launched Gaussian coupler. It is assumed that a 0.225 μm waveguide, which is single moded and as close to the second mode cutoff width of 0.24364 μm as possible using 0.025 μm separation in FDTD. The calculations assumed a 0.225 um single mode waveguide and coupler lengths of 27.25 um and 111.5 um.

Figure 14:
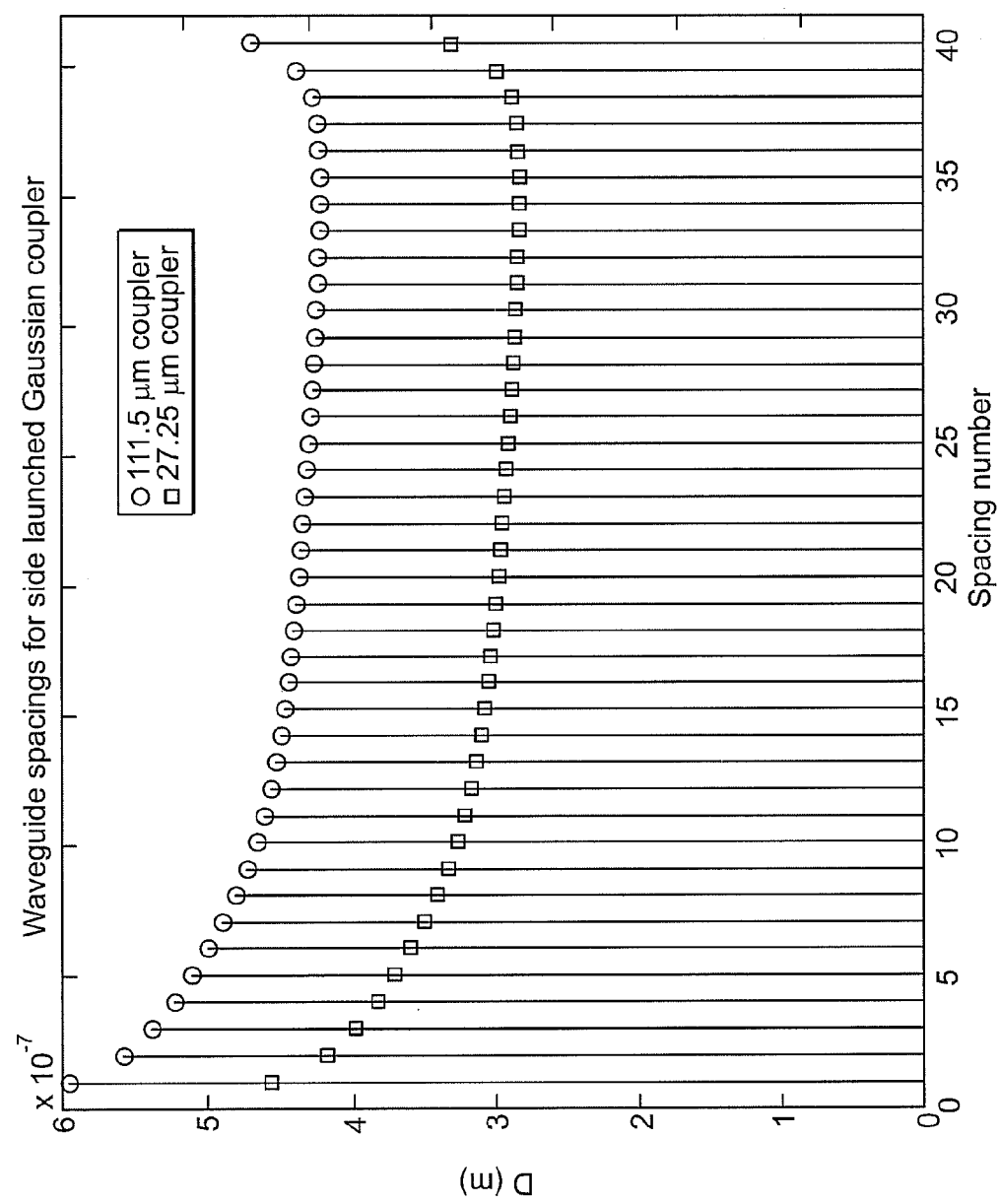
FIG. 14 is a graph demonstrating waveguide spacings required to create the 41 waveguide side launched Gaussian coupler.

The results are shown in FIG. 14. Note for such high index contrast and confined modes, the spacing must be small. Even worse, though, are the very slight changes in spacing required from one pair of waveguides to another. Therefore, even though the coupled waveguides work very well in theory, they may be hard to fabricate. However, it is assumed that this problem can be solved by using thinner, less confining waveguides or a lower, but still high, index contrast system. Otherwise, the coupling will differ from the ideal case.

Unfortunately, the output coupler 8, as shown in FIG. 1, for this new AWG cannot be constructed like the input, using coupled modes. Consider a profile generated across coupled waveguides some distance L from the excitation of one of the waveguides. If the complex conjugate of the profile is taken, the process will be reversed. All of the light will return to the original waveguide in the same distance L. This behavior is a direct consequence of Eq. 12. Taking the derivative in the −z direction, $$\frac{da}{d(-z)} = -\frac{da}{dz} = -Ka$$ Eq. 29

Figure 15A:
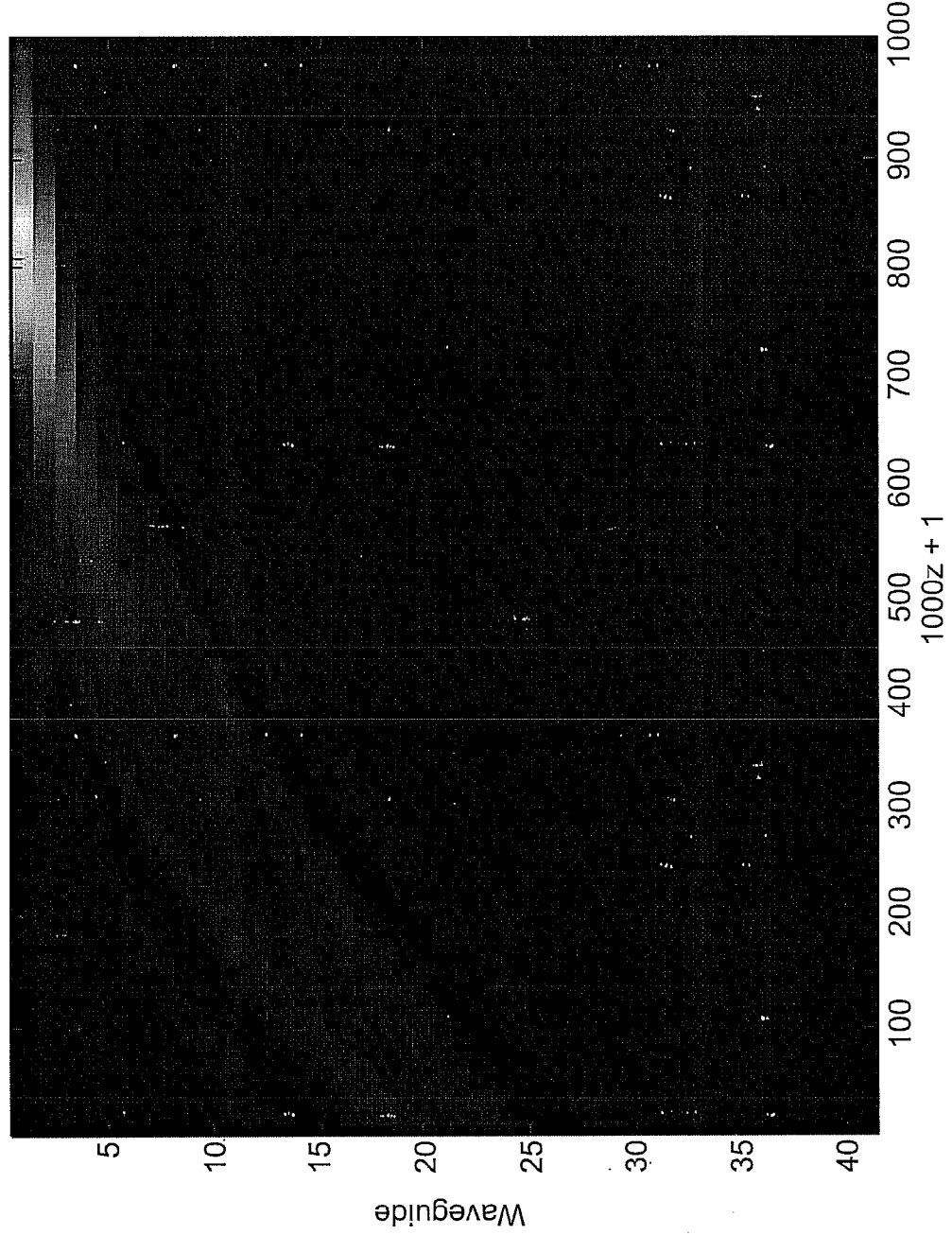
FIGS. 15A-15B are graphs demonstrating refocusing of the 41 waveguide coupler into a different waveguide.

Thus going in the −z direction switches the sign of the π/2 phase change in K. One may conclude that the mode amplitudes at z=−L are the complex conjugates of those at z=L. Since the profile at z=−L converges to one waveguide at z=0, the conjugates of the profile at z=L will also converge back to the original waveguide in distance L. This property is shown for the 41 waveguide side launched Gaussian coupler in FIG. 15A.

Figure 15B:
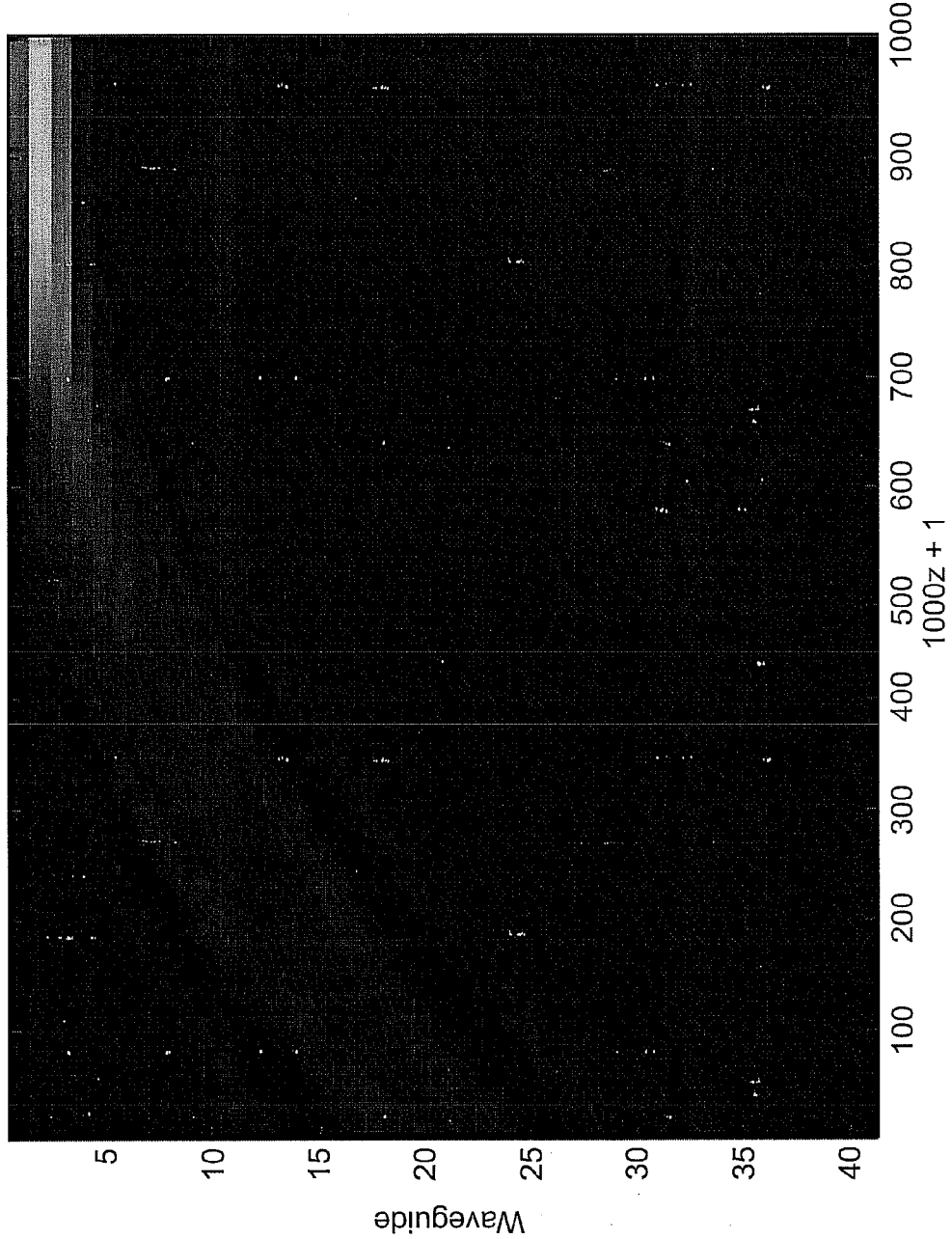

Unfortunately, it does not seem to be simple to add a phase to the mode amplitude profile to make it converge to a different waveguide. FIG. 15B shows the result when a linear phase of slope 3π/40 is added in addition to the complex conjugation. It is clear that the light focuses to the second to last waveguide more than the others, but it is far from 100%. Furthermore, the output appears at a smaller z than the simple reversal. Thus, one cannot remove the signal focused here without affecting the operation of the coupler beyond that z. Even if could somehow engineer 100% power into different output waveguides as a function of phase, one would also need to ensure that this effect happened at the same z. For these reasons, the idea of using a waveguide coupler as the output of our AWG is abandoned. It may be possible to do so, but the waveguide coupler physics do not suggest an immediate solution.

Since the use of some sort of waveguide coupler for the AWG output is not desirable, because of the need to avoid the disadvantages of MMIs, the use of a traditional free space, or star, coupler for this purpose is more desirable.

Although the present invention has been shown and described with respect to several preferred embodiments thereof, various changes, omissions and additions to the form and detail thereof, may be made therein, without departing from the spirit and scope of the invention.

What is claimed is:

1. An arrayed waveguide grating (AWG) device comprising:
   a plurality of arrayed waveguides positioned close to each other so that an input signal excites one of these coupled waveguides and the power is then transferred to all of said arrayed waveguides so there are enough degrees of freedom in the device to achieve distribution, said arrayed waveguides comprise 0.225 μm waveguides.

2. The AWG device of claim 1, wherein said distribution comprises a uniform distribution.

3. The AWG device of claim 1, wherein said distribution comprises a Gaussian distribution.

4. The AWG device of claim 1, wherein said arrayed waveguides are aligned and positioned in accordance with Coupled Mode Theory.

5. The AWG device of claim 1, wherein said distribution comprises a combination of uniform and Gaussian distributions.

6. A method of performing an arrayed waveguide grating (AWG)-based operations on an input signal comprising:
providing a plurality of arrayed waveguides positioned close to each other so there are enough degrees of freedom to achieve distribution, said arrayed waveguides comprise 0.225 μm waveguides; and
exciting one of these arrayed waveguides using said input signal so the power is then transferred to all of said arrayed waveguides.

7. The method of claim 6, wherein said distribution comprises a uniform distribution.

8. The method of claim 6, wherein said distribution comprises a Gaussian distribution.

9. The method of claim 6, wherein said arrayed waveguides are aligned and positioned in accordance with Coupled Mode Theory.

10. The method of claim 6, wherein said distribution comprises a combination of uniform and Gaussian distributions.

* * * * *